US008545187B2

(12) United States Patent
Presz, Jr. et al.

(10) Patent No.: US 8,545,187 B2
(45) Date of Patent: Oct. 1, 2013

(54) SYSTEMS AND METHODS FOR PROTECTING A WIND TURBINE IN HIGH WIND CONDITIONS

(75) Inventors: Walter M. Presz, Jr., Wilbraham, MA (US); Michael J. Werle, West Hartford, CT (US); Robert H. Dold, Monson, MA (US); Jason Barnes, Westfield, MA (US); Thomas J. Kennedy, III, Wilbraham, MA (US); Jason Gawencki, Windsor, CT (US); William Scott Keeley, Charlestown, RI (US); Jason Dionne, Simsbury, CT (US); Fyodor Grechka, Willington, CT (US); Stanley Kowalski, III, Wilbraham, MA (US); Stanley Kowalski, Jr., Wilbraham, MA (US); Timothy Hickey, East Longmeadow, MA (US); John Urbanowicz, Somers, CT (US)

(73) Assignee: FloDesign Wind Turbine Corp., Waltham, MA (US)

( * ) Notice: Subject to any disclaimer, the term of this patent is extended or adjusted under 35 U.S.C. 154(b) by 774 days.

(21) Appl. No.: 12/555,380

(22) Filed: Sep. 8, 2009

(65) Prior Publication Data

US 2010/0080683 A1    Apr. 1, 2010

Related U.S. Application Data

(60) Provisional application No. 61/191,359, filed on Sep. 8, 2008.

(51) Int. Cl.
*F01D 25/28* (2006.01)

(52) U.S. Cl.
USPC ...................................... 416/246; 416/DIG. 6

(58) Field of Classification Search
USPC .............. 415/4.3, 4.5, 9, 126, 127, 128, 148, 415/157, 158, 167.1; 416/DIG. 6, 142, 143, 416/246; 417/183, 184
See application file for complete search history.

(56) References Cited

U.S. PATENT DOCUMENTS

| | | | | |
|---|---|---|---|---|
| 2,025,577 A | * | 12/1935 | Diehl | 417/167 |
| 2,799,993 A | * | 7/1957 | Stovern et al. | 60/482 |
| 3,128,036 A | * | 4/1964 | McBride | 415/126 |
| 4,204,799 A | * | 5/1980 | de Geus | 415/4.5 |

(Continued)

OTHER PUBLICATIONS

Nasa Jet Propulsion Laboratory website, http://marsrovers.jpl.nasa.gov/technology/is_entry_descent_landing.html, Jan. 14, 2007.*

(Continued)

*Primary Examiner* — Edward Look
*Assistant Examiner* — William Grigos
(74) *Attorney, Agent, or Firm* — McCarter & English, LLP

(57) ABSTRACT

Systems for protecting a wind turbine in high wind conditions are disclosed. A shrouded turbine may have an ejector shroud disposed adjacent and downstream of a turbine shroud. In one version, the ejector shroud can move to surround the turbine shroud. In another version, the turbine can be pivoted on a support tower to cover the intake end of the turbine and rotate the turbine about an axis at a right angle to the tower axis. In another version, the turbine is supported by a telescoping tower which may be retracted to lower the turbine in high winds. In another version, the tower sections may be connected by a pivotable connection and supported by guy wire(s) which may be lengthened to lower the upper tower section pivotally.

5 Claims, 14 Drawing Sheets

(56) References Cited

U.S. PATENT DOCUMENTS

| | | | | |
|---|---|---|---|---|
| 4,311,434 | A | * | 1/1982 | Abe .............................. 416/142 |
| 4,324,985 | A | * | 4/1982 | Oman ............................. 290/55 |
| 4,469,956 | A | | 9/1984 | D-Amato |
| 4,502,637 | A | * | 3/1985 | Nightingale ............. 239/265.17 |
| 4,786,016 | A | * | 11/1988 | Presz et al. .................... 244/130 |
| 5,002,092 | A | * | 3/1991 | Oirschot ....................... 137/891 |
| 5,178,518 | A | | 1/1993 | Carter, Sr. |
| 5,599,172 | A | | 2/1997 | McCabe |
| 5,761,900 | A | * | 6/1998 | Presz, Jr. ........................ 60/262 |
| 6,132,172 | A | * | 10/2000 | Li ................................... 416/11 |
| 2004/0042894 | A1 | * | 3/2004 | Smith ............................ 415/4.3 |
| 2004/0120820 | A1 | * | 6/2004 | Dery et al. ................. 416/197 A |
| 2005/0005562 | A1 | * | 1/2005 | Henderson et al. ............. 52/633 |
| 2006/0213145 | A1 | | 9/2006 | Haller |
| 2009/0087308 | A2 | | 4/2009 | Presz, Jr. et al. |
| 2009/0097964 | A1 | | 4/2009 | Presz, Jr. et al. |

OTHER PUBLICATIONS

International Preliminary Report on Patentability for International Application No. PCT/US2009/056182 from the International Bureau of WIPO, dated Mar. 8, 2011 (6 pages).

* cited by examiner

SYSTEMS AND METHODS FOR PROTECTING A WIND TURBINE IN HIGH WIND CONDITIONS

BACKGROUND

This application claims priority to U.S. Provisional Patent No. 61/191,359, filed on Sep. 8, 2008. The provisional application is hereby fully incorporated by reference.

The present disclosure relates to wind turbines, particularly systems and/or methods for protecting wind turbines in high wind conditions.

Conventional wind turbines used for power generation generally have two to five open blades arranged like a propeller, the blades being mounted to a horizontal shaft attached to a gear box which drives a power generator. Such turbines are generally known as horizontal axis wind turbines, or HAWTs. Although HAWTs have achieved widespread usage, their efficiency is not optimized. In particular, they will not exceed the Betz limit of 59.3% efficiency in capturing the potential energy of the wind passing through it.

Conventional wind turbines have three blades and are oriented or pointed into the wind by computer controlled motors. These turbines typically require a supporting tower ranging from 60 to 90 meters in height. The blades generally rotate at a rotational speed of about 10 to 22 rpm. A gear box is commonly used to step up the speed to drive the generator, although some designs may directly drive an annular electric generator. Some turbines operate at a constant speed. However, more energy can be collected by using a variable speed turbine and a solid state power converter to interface the turbine with the generator.

When conventional HAWTs are exposed to excessively high speed winds, the additional wind energy can produce enough power to burn out the generator of otherwise damage the turbine. In such strong wind conditions, the blades can be furled or the entire driveshaft can be yawed to cause a severe reduction in the rotor power coefficient. These methods work well for protecting the turbine at wind speeds of 45-50 miles per hour. However, in hurricane force winds of 74 mph or higher, damage may still occur.

In addition, because the blades of a HAWT are located so close to the tower, strong winds are known to bend the blades back so that the blades hit the tower. This is phenomenon is known as a tower strike. If guy wires are used to stabilize the tower, they generally must be attached to the tower at a point below the lowest reach of the blades to avoid being struck by the blades. Because the blades of conventional HAWTs are located so close to the azimuthal (yaw) pivot point, the tower supporting the turbine generally cannot be a tripod type tower with a wide base. In addition, the HAWT cannot generally be mounted on a wide structure, such as a building.

It would be desirable to provide different methods by which a wind turbine can be protected from excessive wind speeds.

SUMMARY

Disclosed in the present disclosure are various systems and methods for protecting a shrouded wind turbine from excessive wind conditions. Such systems and methods take advantage of the small size of the shrouded wind turbine to use methods that are not applicable to conventional wind turbines.

The smaller overall diameter of the shrouded wind turbine versus a long bladed HAWT allows the turbine to be mounted on a tripod type tower or to be mounted on a tower with guy wires that may be affixed to the top of the tower, allowing for the greatest support. Some methods and construction are proposed by which the shroud is actuated to lessen the wind force on the turbine blades, or the turbine may be moved toward the ground to protect the turbine from the effects of overspeed or tower stress. The legs of a tripod type tower may spread at the bottom while hinging at the top to provide a wide stance and a lower position of the turbine. The shrouded configuration of the turbine allows the system to be lowered in a manner not possible with long bladed propeller driven turbines. In another iteration, the tower telescopes downward in high winds. A pressurized telescoping tower with components designed to break away in high winds allows a gradual descent. Another embodiment employs sacrificial attachments or bolts that give way in high winds to bring the turbine down. The turbine can slide down the tower and may be cushioned during the drop by the deployment of inflated articles such as balloons. Alternatively, a primary guy wire can be lengthened to pivot the tower, either in segments or in its entirety, to the ground. In another embodiment, a hinged tower can be employed to lower the tower.

Disclosed in embodiments is a wind turbine assembly comprising: an impeller, prop, or rotor/stator; a shroud disposed about the impeller, prop, or rotor/stator; and an ejector concentrically disposed about the shroud. The shroud and ejector are configured such that the ejector may move parallel to a rotational axis shared by the shroud and the ejector.

The wind turbine assembly may further comprise a turbine base and at least one vertical support. The at least one vertical support is attached to the ejector and defines a pitch axis generally perpendicular to the rotational axis, so that an intake end of the turbine may be rotated to a plane parallel to the turbine base.

The wind turbine assembly may further comprise a turbine base and at least three tower legs, each tower leg having a top end, a bottom end, and a fixed length. The top end of each tower leg is pivotally connected to the turbine base; the bottom ends of the tower legs together define a tower base having a tower circumference; and the assembly is configured so that the tower circumference can be varied.

The tower may have a plurality of horizontal supports, each horizontal support connecting two adjacent tower legs and being configured so that the tower circumference can be varied. The tower may alternatively have a plurality of diagonal supports, each diagonal support having a first end and a second end, the first end being attached to one tower leg and the second end being attached to another tower leg, such that the first end of the diagonal support is closer to the turbine base than the second end; and each diagonal support being configured so that the tower circumference can be varied.

Disclosed in other embodiments is a wind turbine assembly comprising: a shrouded wind turbine; a turbine base to which the shrouded wind turbine is operatively connected; and at least three tower legs, each tower leg having a top end, a bottom end, and a fixed length; wherein the top end of each tower leg is pivotally connected to the turbine base; the bottom ends of the tower legs together define a tower base having a tower circumference; and the assembly is configured so that the tower circumference can be varied.

Again, horizontal supports and diagonal supports may be present. The supports may be of a fixed length. Alternatively, each horizontal support has a fixed length, and the two adjacent tower legs are configured to allow the horizontal support to change its distance from the turbine base. Similarly, each diagonal support may have a fixed length, and the two tower legs are configured to allow at least one end of the diagonal support to change its distance from the turbine base.

Disclosed in still other embodiments is a wind turbine assembly comprising: a wind turbine; a tower comprising a first element and a second element, the tower elements being concentric to each other; and means for moving the tower elements from an extended position to a lowered position.

The means for moving may be a frangible retaining member; or a pressurized system including release valves, such that a release of pressure causes the first and second elements to move towards each other.

At least one of the first and second elements may be filled with a compressed fluid such that when the means for moving is operated, the compressed fluid reduces the rate at which the first and second elements move towards each other.

The wind turbine assembly may further comprise an inflatable article configured to cushion the wind turbine as the first and second elements move towards each other.

Disclosed in still other embodiments is a wind turbine assembly comprising: a wind turbine; and a tower comprising a first element, a pivot, and a second element, the first element supporting the turbine and the pivot being located between the first and second element.

The second element may be shorter than the first element.

A primary guy wire may be included, the guy wire being affixed to the tower near the wind turbine so that the length of the primary guy wire determines the angle between the first element and the second element about the pivot.

These and other non-limiting features or characteristics of the present disclosure will be further described below.

BRIEF DESCRIPTION OF THE DRAWINGS

The following is a brief description of the drawings, which are presented for the purposes of illustrating the disclosure set forth herein and not for the purposes of limiting the same.

DETAILED DESCRIPTION

Figure 1:
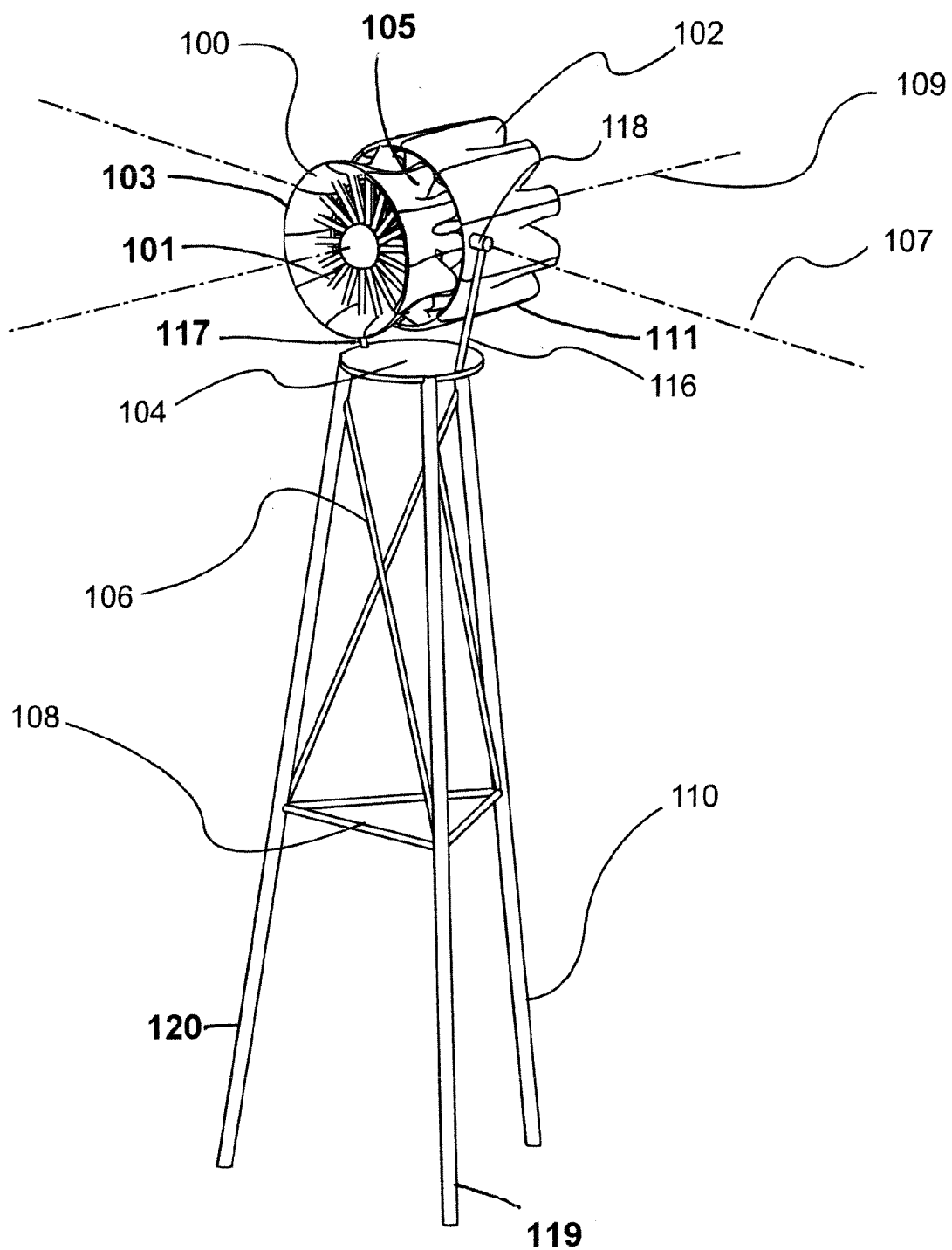
FIG. 1 is a perspective view of a wind turbine of the present disclosure pivotally supported for rotation about a horizontal axis on a tripod tower.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 is a perspective view of a first embodiment of a wind turbine of the present disclosure, in a form also known as a mixer-ejector wind turbine (MEWT). The MEWT is a new type of wind turbine that uses a shrouded impeller, prop, or rotor/stator to improve the efficiency of a wind turbine such that more power may be extracted for a turbine having the same area than other current types of wind turbines. The MEWT accomplishes this by drawing air from a larger area than the most common type of wind turbine, the horizontal-axis wind turbine (HAWT).

A wind turbine can theoretically capture at most 59.3% of the potential energy of the wind passing through it, a maximum known as the Betz limit. The amount of energy captured by a wind turbine can also be referred to as the efficiency of the turbine. The MEWT may exceed the Betz limit.

Referring to FIG. 1, the turbine 100 comprises an impeller located at an intake end of a turbine shroud 103. The impeller may generally be any assembly in which blades are attached to a shaft and able to rotate, allowing for the generation of power or energy from wind rotating the blades. As illustrated here, the impeller is a rotor-stator assembly. The stator 101 engages the shroud 103, and the rotor (not shown) engages a motor/generator (not shown). The stator 101 has non-rotating blades which turn the air before it reaches the rotor. The blades of the rotor then rotate, generating power in the generator. The shroud 30 comprises a ringed airfoil, or in other words is approximately cylindrical and has an airfoil shape, with the airfoil configured to generate relatively lower pressure within the turbine shroud (i.e. the interior of the shroud) and relatively higher pressure outside the turbine shroud (i.e. the exterior of the shroud). The impeller and the motor/generator are contained within the shroud. The shroud 103 may also have mixer lobes 105 around an outlet or exhaust end of the shroud. The mixer lobes are generally uniformly distributed around the circumference of the exhaust end. The mixer lobes generally cause the exhaust end of the shroud, where air exits, to have a generally peak-and-valley shape about its circumference. Put another way, the lobes 105 are located along the trailing edge of the shroud.

The turbine 100 also comprises an ejector 111, which is engaged with the shroud. The ejector comprises a ringed airfoil, or in other words is approximately cylindrical and has an airfoil shape, with the airfoil configured to generate relatively higher pressure within the ejector (i.e. between the shroud 103 and the ejector 111) and relatively lower pressure outside the ejector 111. The ejector may also have mixer lobes

102. The mixer lobes generally cause the exhaust end of the ejector 111, where air exits, to have a generally peak-and-valley shape about its circumference. Put another way, the mixer lobes are located along the trailing edge of the ejector 111.

The ejector shroud 111 has a larger diameter than the turbine shroud 103. The turbine shroud 103 engages the ejector shroud 111. Put another way, the exhaust end of the turbine shroud fits within the intake end of the ejector shroud, or the intake end of the ejector shroud surrounds the exhaust end of the turbine shroud. The turbine shroud 103 and ejector shroud 111 are sized so that air can flow between them. Phrased another way, the ejector shroud 111 is concentrically disposed about the turbine shroud 103 and is downstream of the turbine shroud 103. The impeller (i.e. stator/rotor 101), turbine shroud 103, and ejector shroud 111 all share a common rotational axis 109, i.e. are coaxial to each other.

The mixer lobes 102, 105 allow for advanced flow mixing and control. The turbine shroud and ejector shroud are different from similar shapes used in the aircraft industry because in the MEWT, flow path provides high-energy air into the ejector shroud. The turbine shroud provides low-energy air into the ejector shroud, and the high-energy air outwardly surrounds, pumps, and mixes with the low-energy air.

The motor/generator may be employed to generate electricity when the wind is driving the rotor. The generator on the turbine may also be used as a motor to drive the impeller, and thus draw air into and through the turbine 100, when the wind is insufficient to drive the rotor.

The ejector shroud 111 has pivot mounts 118 on opposite sides thereof and is mounted to rotate about a pitch axis 107 which is at a right angle to the roll axis 109. At least one vertical support (shown here as two supports 116, 117) connects the turbine 100 to a turbine base 104 which in turn is supported by a tower comprising at least three tower legs 110, 119, 120. The tower has internal support braces such as horizontal supports 108 and diagonal supports 106. A horizontal support can generally be differentiated from a diagonal support on the basis of their connection to two tower legs. A horizontal support connects two adjacent tower legs, and both ends of the horizontal support are generally the same distance from the turbine base 104. In contrast, a diagonal support connects two tower legs (which need not be adjacent) and one end of the diagonal support is closer to the turbine base than the other end of the diagonal support.

Figure 2:
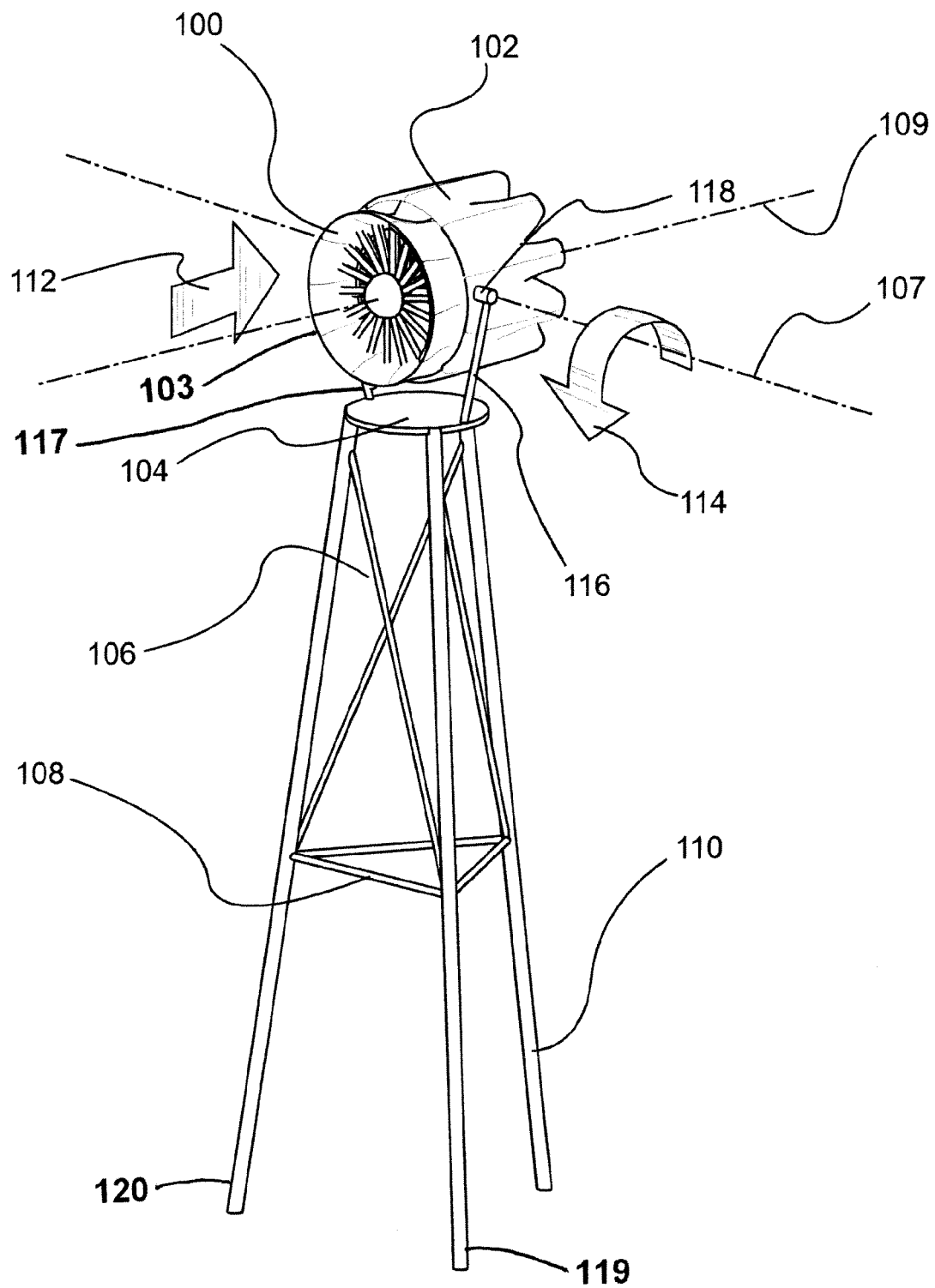
FIG. 2 is a perspective view showing a mixer-ejector wind turbine of the present disclosure with the ejector protecting the shroud.

Referring to FIG. 2, the turbine base 104 may rotate about a yaw axis (not shown) so that the turbine 100 may face in any horizontal direction, denoted by arrow 112 which represents the wind stream. The shroud 103 and ejector 111 of the turbine are configured so that the ejector can move in the direction of the rotational axis 109, which is the common axis shared by the shroud and the ejector. In other words, the ejector moves parallel to or along the yaw axis 109. This allows the shroud to essentially be surrounded by the ejector. Compare the turbine in FIG. 1 with the turbine in FIG. 2. For example, the shroud and ejector may be connected to each other such that the lobes 105 on the shroud 103 move along tracks (not shown) on the ejector 111.

Figure 3:
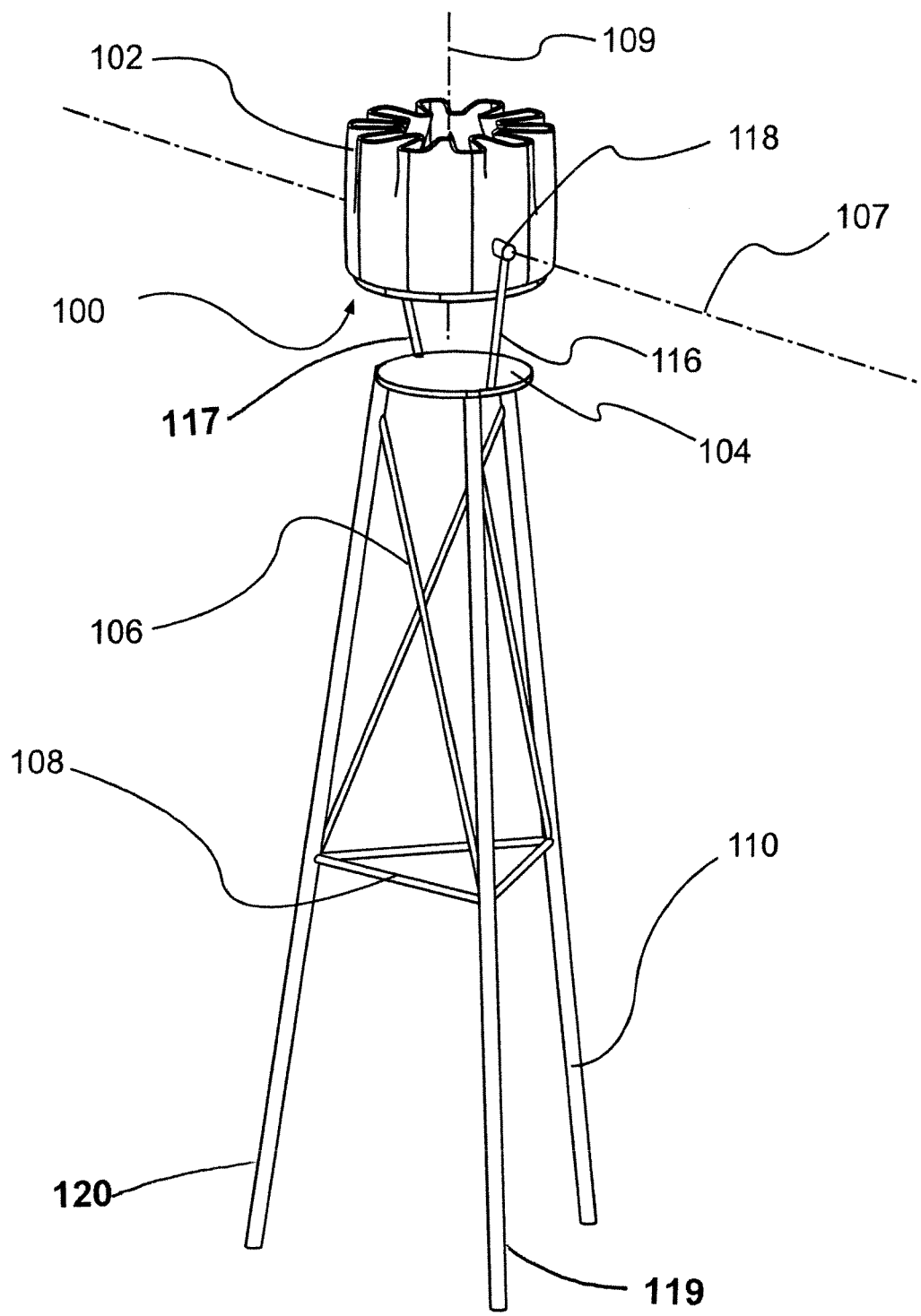
FIG. 3 is a perspective view the wind turbine rotated to parallel a yaw axis, so that wind cannot contact the blades inside the wind turbine.

As seen in FIG. 3, the turbine 100 can then be rotated about the pitch axis 107 such that the impeller axis 109 is disposed vertically, positioning the ejector and shroud at right angles to the wind and preventing rotation of the impeller in the wind turbine. Described in other words, the intake end of the turbine may be rotated to a plane parallel to the plane of the turbine base.

Figure 4:
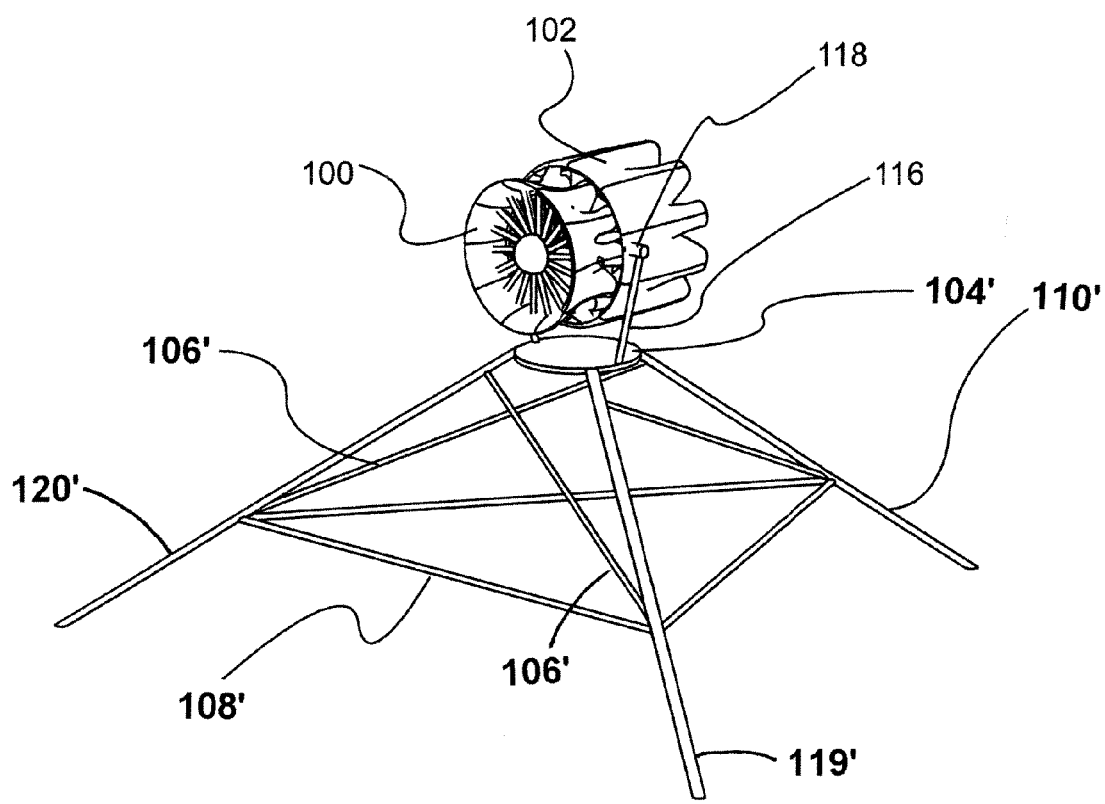
FIG. 4 is a perspective view showing a wind turbine mounted on a telescoping tripod tower.

Referring to FIG. 4, another embodiment is shown wherein the turbine 100 is supported on a turbine base 104'. The turbine base 104' is pivotally connected to the top end of at least three tower legs 110', 119', 120' to form a tower. The bottom ends of the tower legs define a tower base having a tower circumference. Horizontal supports 108' and diagonal supports 106' are also shown. This tower arrangement can be useful when the wind turbine is to be mounted atop an elevated structure, such as the top of a tall building, and thus only a low-rise tripod is required.

In this embodiment, the tower legs 110', 119', 120' can be moved to change the height of the turbine 100. Put in other words, the tower circumference at the base of the tower can be varied to vary the height of the turbine above the tower base. The horizontal supports 108' may be configured to have a variable length as the tower legs are moved. Alternatively, the tower legs may be configured so that a horizontal support of a fixed length can be moved relative to the turbine base (i.e. up and down the tower legs). Similarly, the horizontal supports 106' may be configured to have a variable length as the tower legs are moved, or the tower legs are configured to allow at least one end of the diagonal support to move relative to the turbine base.

Figure 5:
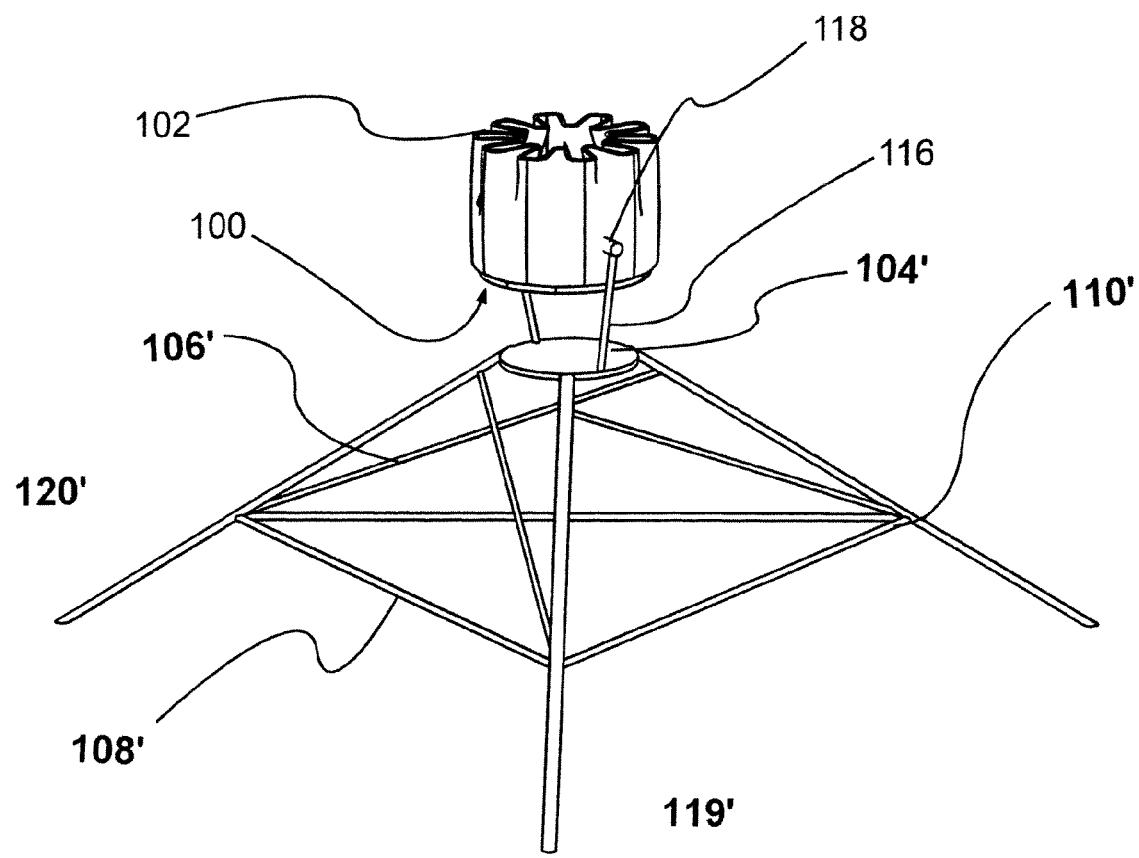
FIG. 5 is a perspective view showing the wind turbine rotated about its pivotal mount to orient the axis of turbine rotation vertically, and mounted on a telescoping tripod tower.

As seen in FIG. 5, the wind turbine 100 can be configured to allow the turbine to be rotated so that only the sides of the shroud and ejector are contacted by the wind stream. A telescoping tower can also be used to lower the height of the turbine and remove it from high speed wind.

Figure 6:
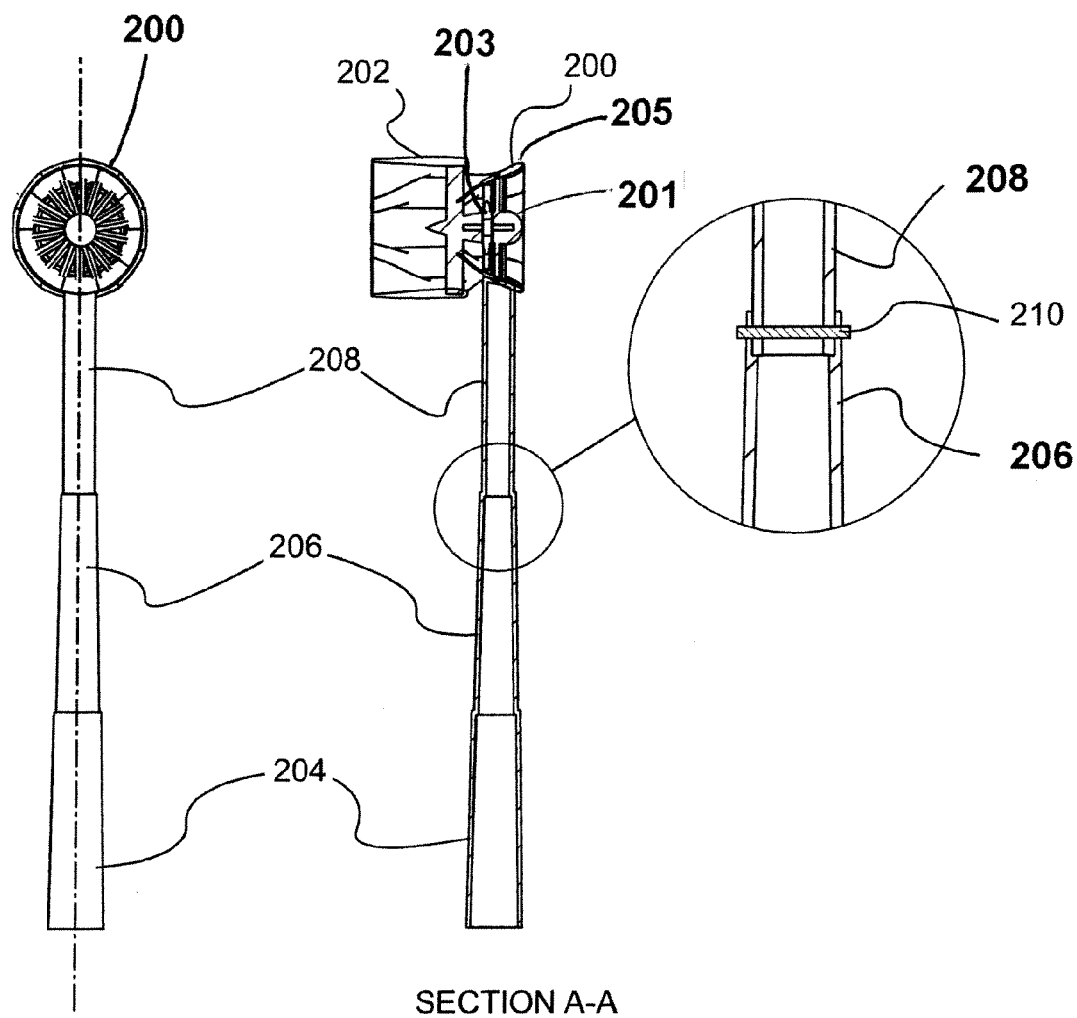
FIG. 6 is a front view and side view of a wind turbine mounted on a telescoping tower, the tower being composed of tower elements retained in relation to each other by a frangible connection.

FIG. 6 illustrates another embodiment of a wind turbine and tower assembly. As seen in the cross-sectional view, the wind turbine 200 has a stator 201, rotor 203, a shroud 205, and an ejector 202 disposed downstream and adjacent the shroud 205. The turbine 200 is supported on a tower made up of multiple elements, here shown as first element 208, second element 206, and third element 204. The tower elements are generally concentric to each other.

The tower comprises means for moving the tower elements from an extended position to a lowered or retracted position. For example, as illustrated in the enlarged view, first element 208 and second element 206 are connected by a frangible retaining member 210. The frangible pin 210 is designed such that upon a predetermined amount of flexing of the tower, due to high winds, the pin ruptures so that first element 208 slides downwardly into second element 206, lowering the turbine 200.

The interior of the tower elements 204, 206, 208 may be filled with a compressed fluid, such as air or hydraulic fluid, so that the escape of the fluid controls the rate of descent of the tower elements. Put in different words, the compressed fluid reduces the rate at which two tower elements move towards each other when the means for moving the tower elements is operated or actuated.

In other embodiment, the means for moving the tower elements may be a pressurized system that includes pressure release valves to release the compressed fluid from the interior of the tower.

Figure 7A:
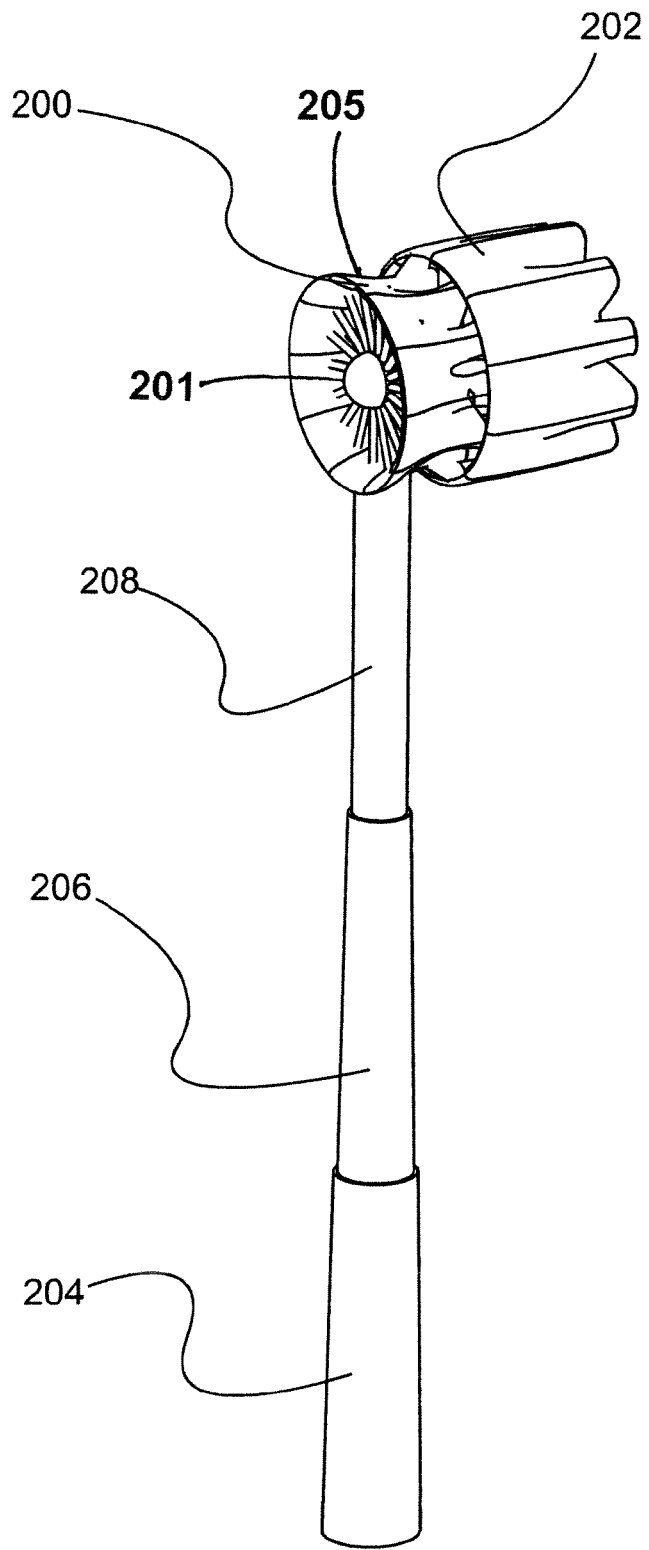
FIG. 7A is a perspective view of a wind turbine on a telescoping tower shown in the extended position.
Figure 7B:
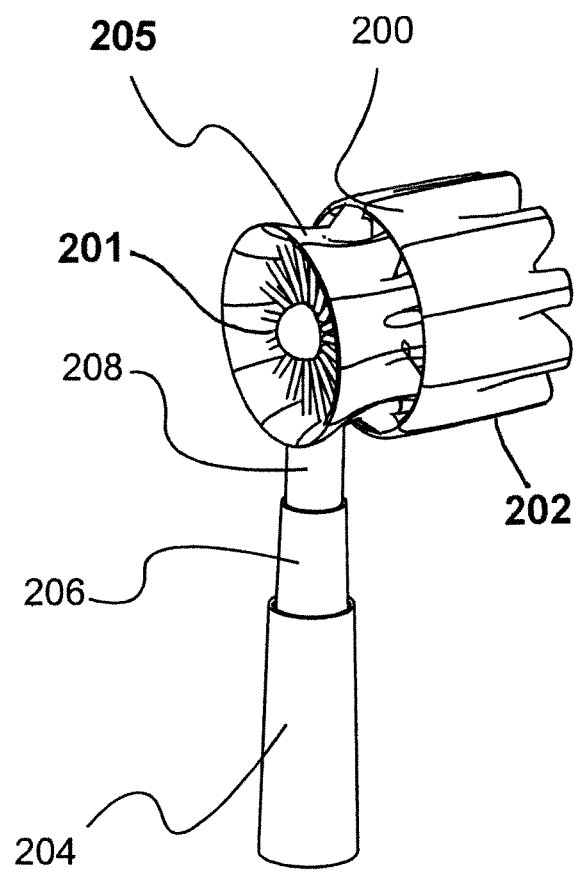
FIG. 7B is a perspective view of a wind turbine on a telescoping tower shown in a lowered or retracted position.

FIG. 7A illustrates the tower elements in an extended position, and FIG. 7B illustrates the tower elements in a retracted or lowered position.

Figure 8A:
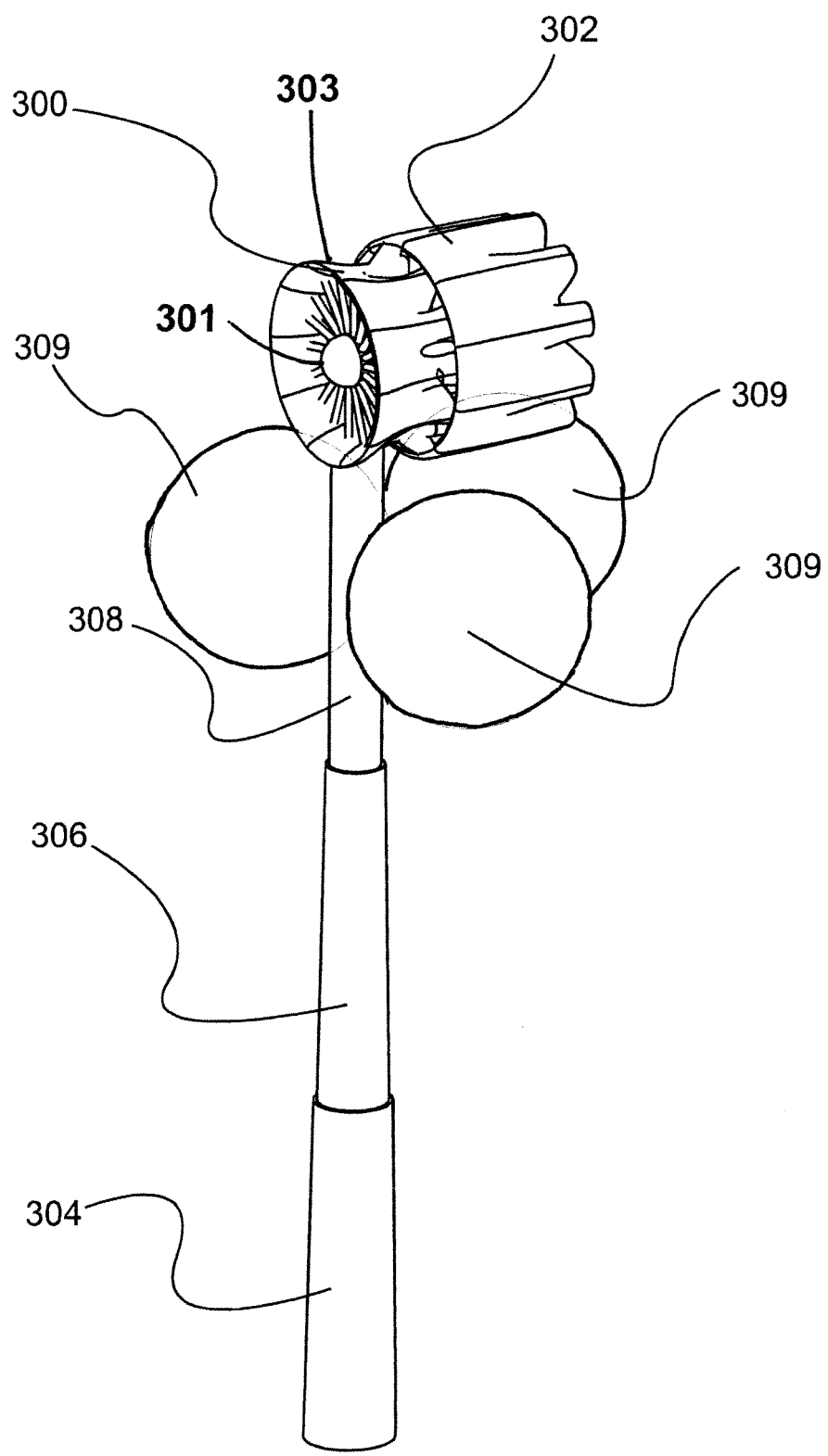
FIG. 8A shows an alternate embodiment, including inflatable balloons deployed to cushion the descent of the turbine upon retraction of the telescoping tower.
Figure 8B:
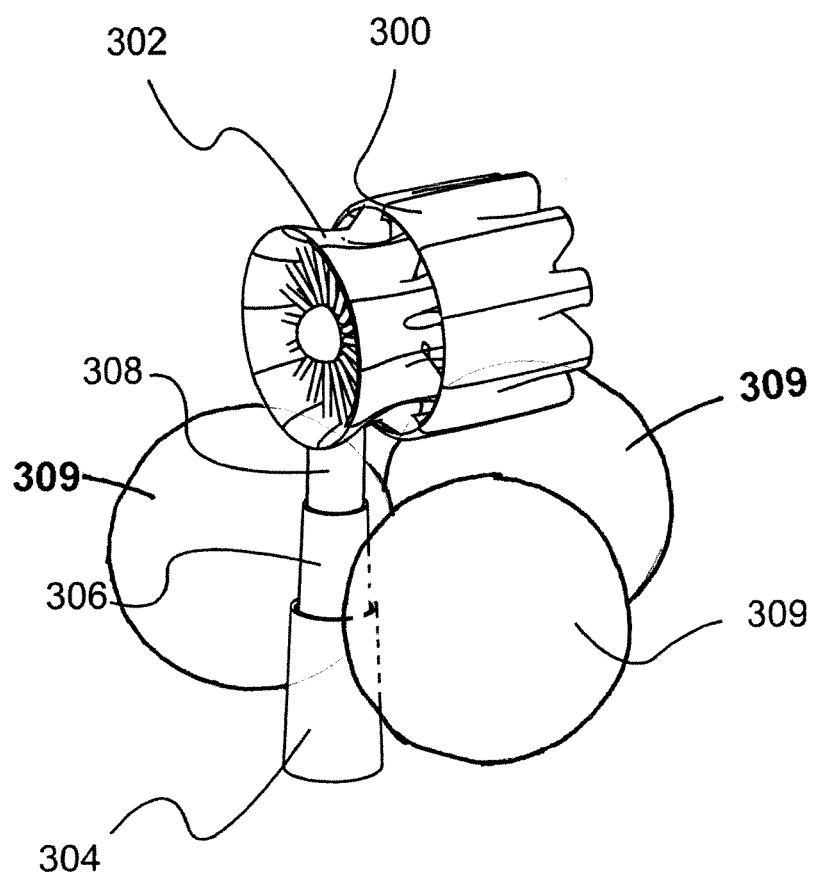
FIG. 8B shows the embodiment of FIG. 8A in the retracted position.

FIG. 8A shows another embodiment of the wind turbine 300. The turbine 300 has a stator 301 with a rotor (not shown) immediately adjacent and downstream of the stator. A shroud 303 is disposed thereover and an ejector 302 disposed immediately adjacent the downstream edge of the shroud 303. The turbine 300 is supported by an upper tower section 308 which is received in a telescoping manner into a lower tower section 306 which, in turn, is received in a telescoping manner into a base tower section 304. At least one inflatable article 309 is located below the turbine 300; here, three inflatable articles are shown in an inflated deployed position. The shape of the inflatable article is not particularly important. The inflatable article 309 can be located anywhere between the turbine 300 and the ground. For example, the inflatable article may deploy from the bottom of the turbine or from a tower section. In FIG. 8B, the tower sections have been collapsed, and the inflatable articles 309 are positioned to cushion the descent of the turbine 300.

Figure 9:
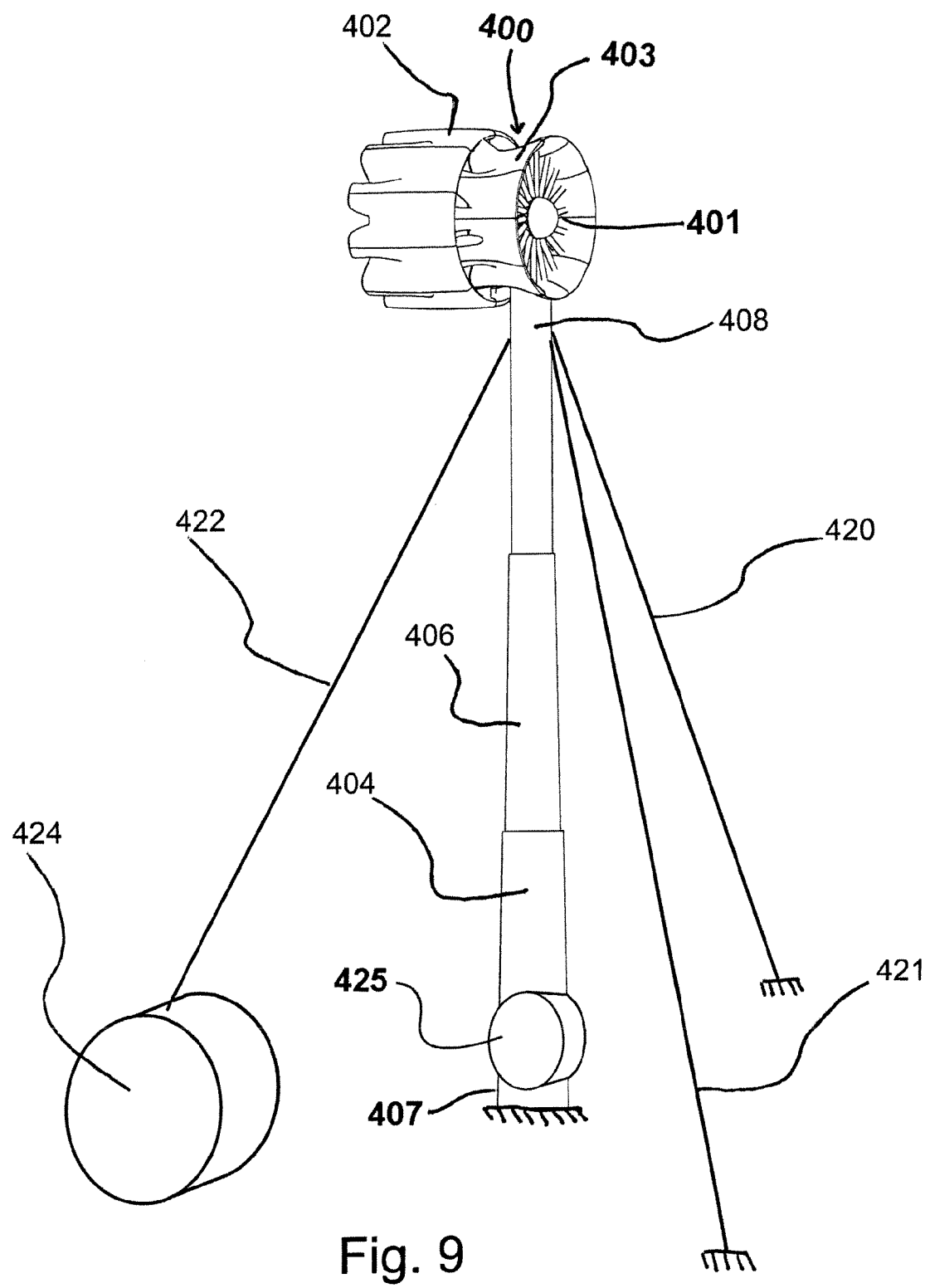
FIG. 9 shows another embodiment, with a wind turbine supported by a pivoting tower having a tension cable mounted to control the pivotal movement of the tower.

FIG. 9 shows another embodiment of the wind turbine assembly of the present disclosure. The turbine 400 has a stator 401 with a rotor (not shown) immediately adjacent on the downstream side thereof. The rotor-stator assembly is surrounded by a turbine shroud 403. An ejector shroud 402 is mounted downstream and adjacent the turbine shroud 403. The turbine 400 is attached and supported by an upper tower section 408 which is connected to intermediate sections 406 and 404. A pivot 425 is located between tower sections 404 and 407. The tower is secured by tension member or guy wires 421, 420, 422. Primary guy wire 422 is connected at its lower end to a spool or reel mechanism 424 which allows the length of the primary guy wire 422 to be varied. Secondary guy wires 420, 421 may also vary in length or be of a fixed length.

Figure 10:
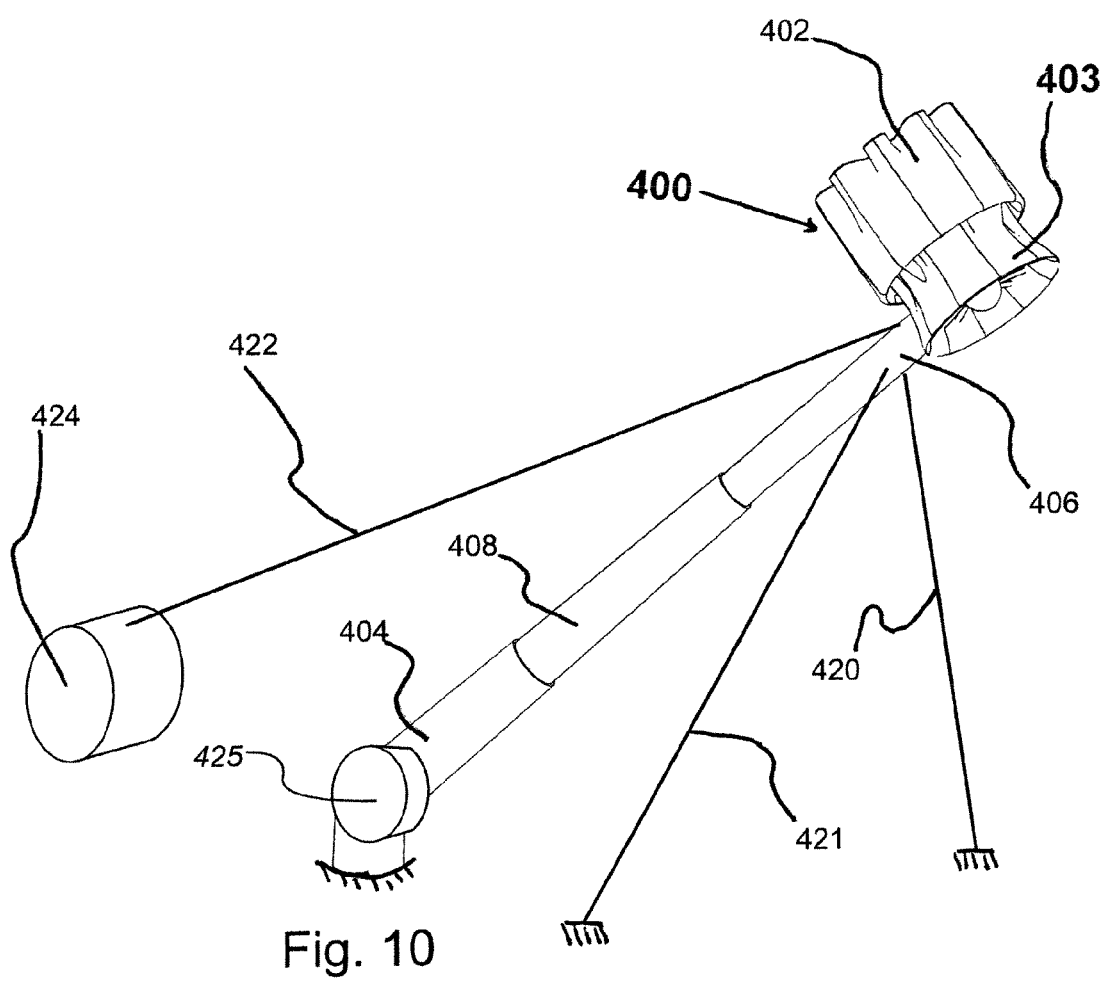
FIG. 10 shows the embodiment of FIG. 9 in the lowered position.

Referring to FIG. 10, the wind turbine 400 is shown in a lowered position in which the reel 424 has paid out or lengthened the primary guy wire 422 thereby permitting the tower to rotate about pivot 425 to a lowered position. Put in other words, the length of the primary guy wire may be used to determine the angle between elements 404 and 407. Alternatively, element 404, pivot 425, and element 407 may be considered together as a single element having a pivot therein.

Figure 11:
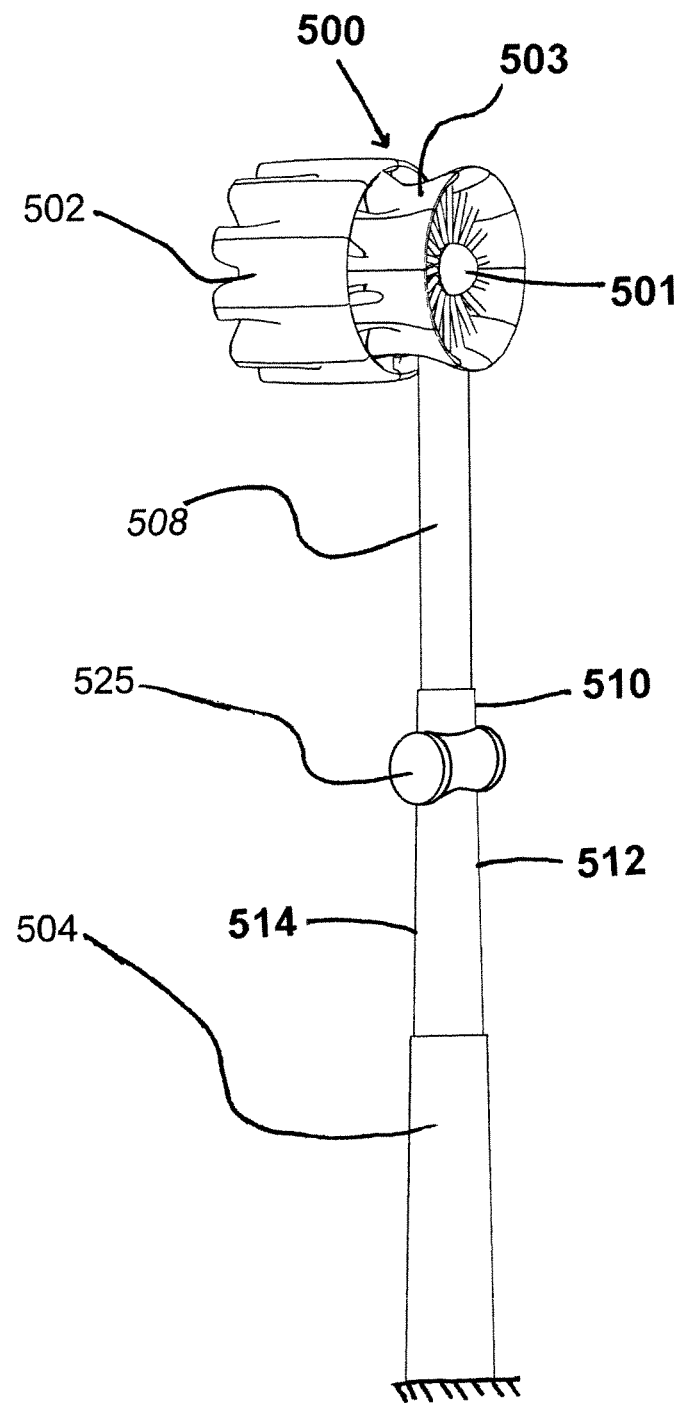
FIG. 11A shows another embodiment of the present disclosure, with a wind turbine mounted on a pivoting tower.
FIG. 11B shows the embodiment of FIG. 11A moved to a lowered position about the pivot in solid outline.
Figure 11:
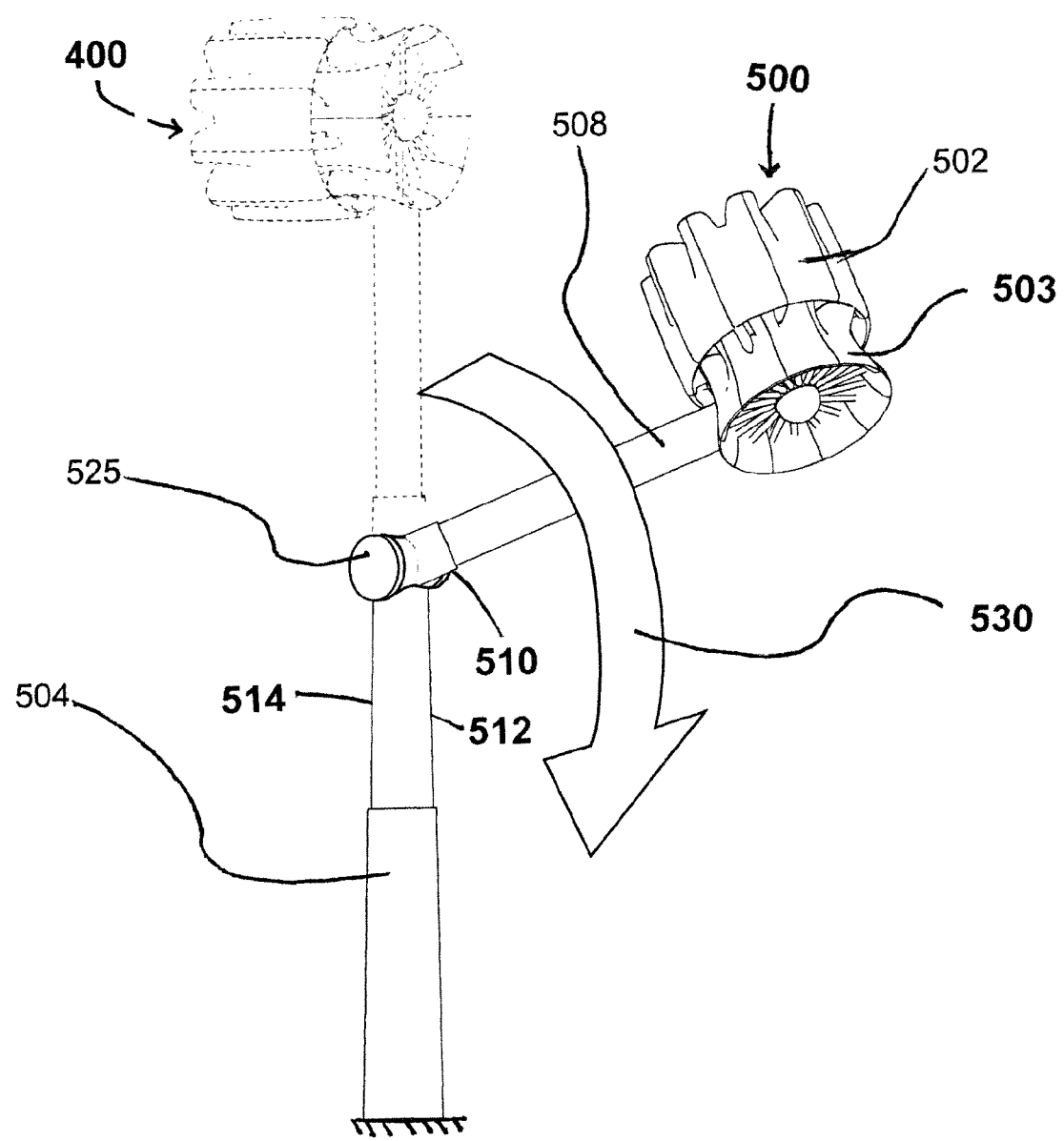

FIGS. 11A and 11B show another embodiment similar to that of FIG. 10. The turbine 500 includes a stator 501 with a rotor (not shown) disposed immediately adjacent on the downstream side thereof. The rotor-stator assembly is surrounded by a turbine shroud 503 which has an ejector shroud 502 disposed adjacent thereto on the downstream side thereof.

The turbine 500 is mounted on the upper tower element 508 of a tower. An intermediate tower element 512 comprises a first element 510, a pivot 525, and a second element 514. The second element 514 of intermediate tower element 512 is connected to a base tower element 504.

FIG. 11B shows the upper tower element 508 and the first element 510 of the tower rotated about the pivot 525 to lower the turbine 400 from the vertical position (shown in dashed outline) to a lowered position (shown in solid outline), indicated by reference numeral 430, such that the excessively high wind does not strike the turbine directly, but at an angle thereby reducing the effective speed of the wind through the turbine. The tower may be lowered by an external device, such as, for example, a crane or other lift equipment (not shown).

As seen in these figures, the pivot 425 may generally be located anywhere along the height of the tower. However, to maximize the amount by which the height of the tower is reduced when the tower is placed in a lowered position, the pivot is generally located within the bottom half of the tower. Put another way, the wind turbine assembly may comprise a wind turbine, a first element located between the wind turbine and the pivot, and a second element (or alternatively a pivot located between the first and second elements), where the first element supports the turbine and the second element is connected to a support base, such as the ground. The second element is shorter than the first element.

The systems and methods of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A wind turbine assembly comprising:
   a wind turbine;
   a tower comprising a first element and a second element, the tower elements being concentric with respect to each other; and
   means for moving the tower elements from an extended position to a lowered position;
   wherein at least one of the first tower element or the second tower element is filled with a compressed fluid such that when the means for moving is operated, the compressed fluid reduces the rate at which the first and second elements move towards each other.

2. The wind turbine assembly of claim 1, wherein the means for moving includes a frangible retaining member.

3. The wind turbine assembly of claim 1, wherein the means for moving is a pressurized system including release valves, such that a release of pressure causes the first and second elements to move towards each other.

4. A wind turbine assembly comprising:
   a wind turbine;
   a tower comprising a first element and a second element, the tower elements being concentric with respect to each other;
   means for moving the tower elements from an extended position to a lowered position; and
   an inflatable article configured to cushion the wind turbine as the first and second elements move towards each other.

5. A wind turbine assembly comprising:
   a wind turbine;
   a tower comprising a first element and a second element, the tower elements being concentric to each other; and
   means for moving the tower elements from an extended position to a lowered position, wherein the means for moving includes a frangible retaining member.

* * * * *